US012451045B2

(12) United States Patent
Lv

(10) Patent No.: US 12,451,045 B2
(45) Date of Patent: Oct. 21, 2025

(54) GATE DRIVER ON ARRAY CIRCUIT

(71) Applicant: TCL China Star Optoelectronics Technology Co., Ltd., Guangdong (CN)

(72) Inventor: Xiaowen Lv, Guangdong (CN)

(73) Assignee: TCL China Star Optoelectronics Technology Co., Ltd., Shenzhen (CN)

(*) Notice: Subject to any disclaimer, the term of this patent is extended or adjusted under 35 U.S.C. 154(b) by 0 days.

(21) Appl. No.: 17/598,889

(22) PCT Filed: Jul. 28, 2021

(86) PCT No.: PCT/CN2021/108789
§ 371 (c)(1),
(2) Date: May 22, 2024

(87) PCT Pub. No.: WO2023/000357
PCT Pub. Date: Jan. 26, 2023

(65) Prior Publication Data

US 2024/0312387 A1 Sep. 19, 2024

(30) Foreign Application Priority Data

Jul. 19, 2021 (CN) ......................... 202110812274.0

(51) Int. Cl.
*G09G 3/20* (2006.01)

(52) U.S. Cl.
CPC ... *G09G 3/2092* (2013.01); *G09G 2310/0267* (2013.01); *G09G 2310/08* (2013.01)

(58) Field of Classification Search
CPC ...... G09G 3/2092; G09G 3/20; G09G 3/3677; G09G 2310/08; G09G 2310/0267
See application file for complete search history.

(56) References Cited

U.S. PATENT DOCUMENTS 10,665,194 B1 * 5/2020 Xu ........................ G09G 3/3677
11,610,525 B2 * 3/2023 Lv ............................ G09G 3/20
11,837,188 B2 * 12/2023 Lv ........................ G09G 3/3266
(Continued)

FOREIGN PATENT DOCUMENTS

CN 103943139 7/2014
CN 104505036 4/2015
(Continued)

OTHER PUBLICATIONS

International Search Report and the Written Opinion Dated Mar. 28, 2022 From the International Searching Authority Re. Application No. PCT/CN2021/108789 and Its Translation Into English. (14 Pages).
(Continued)

*Primary Examiner* — Doon Y Chow

(57) ABSTRACT

A gate driver on array (GOA) circuit includes a first GOA unit. The first GOA circuit includes a first pull-up control module that includes a first transistor, having a gate receiving a control signal, a source receiving a starting signal, and a drain electrically connected to a first node. When the first transistor is turned off, a voltage level of the gate of the first transistor is lower than a voltage level of the source; the source of the first transistor is an end for signal inputting; and the drain of the first transistor is an end for signal outputting.

18 Claims, 5 Drawing Sheets

(56) References Cited

U.S. PATENT DOCUMENTS

| | | | | |
|---|---|---|---|---|
| 2013/0088265 | A1* | 4/2013 | Chen | G11C 19/28<br>327/108 |
| 2014/0055177 | A1* | 2/2014 | Chen | H03K 17/22<br>327/142 |
| 2016/0293095 | A1* | 10/2016 | Zheng | G09G 3/20 |
| 2018/0025695 | A1* | 1/2018 | Han | G09G 3/3677<br>345/213 |
| 2019/0073978 | A1 | 3/2019 | Shi et al. | |
| 2021/0335206 | A1* | 10/2021 | Quan | G09G 3/2092 |
| 2021/0407357 | A1* | 12/2021 | Xi | G09G 3/20 |
| 2022/0122559 | A1* | 4/2022 | Lv | G09G 3/3677 |

FOREIGN PATENT DOCUMENTS

| | | |
|---|---|---|
| CN | 106205538 | 12/2016 |
| CN | 107146589 | 9/2017 |
| CN | 107146590 | 9/2017 |
| CN | 107993627 | 5/2018 |
| CN | 109493783 | 3/2019 |
| CN | 109935191 | 6/2019 |
| CN | 110070828 | 7/2019 |
| CN | 110570799 | 12/2019 |
| CN | 111081196 | 4/2020 |
| CN | 111681589 | 9/2020 |

OTHER PUBLICATIONS

Notification of Office Action and Search Report Dated Jul. 26, 2023 From The State Intellectual Property Office of the People's Republic of China Re. Application No. 202110812274.0 and Its Translation Into English. (19 Pages).

* cited by examiner

GATE DRIVER ON ARRAY CIRCUIT

RELATED APPLICATIONS

This application is a National Phase of PCT Patent Application No. PCT/CN2021/108789 having International filing date of Jul. 28, 2021, which claims the benefit of priority of Chinese Patent Application No. 202110812274.0 filed on Jul. 19, 2021. The contents of the above applications are all incorporated by reference as if fully set forth herein in their entirety.

FIELD AND BACKGROUND OF THE INVENTION

The present disclosure relates to a display technology, and more particularly, to a GOA circuit.

The gate driver on array (GOA) technique is to integrate the gate driver circuits in the array substrate of the display panel to drive the line by line. In this way, the area of the gate driver circuits could be saved and thus the manufacturing cost could be reduced and the narrow side frame design could be realized. This design has been adopted in many types of displays.

SUMMARY OF THE INVENTION

Technical problem

The GOA circuit has a complex structure and many signal lines arranged in a condensed way. Therefore, the requirements for the stability of the GOA circuit are comparatively high. For example, the transistors in the conventional GOA circuits may have leakage currents, which make the GOA unstable.

Technical solution

One objective of an embodiment of the present disclosure is to provide a GOA circuit, which could reduce the leakage currents and raise the stability of the GOA circuit.

According to an embodiment of the present disclosure, a gate driver on array (GOA) circuit is disclosed. The GOA circuit comprises a first GOA unit. The first GOA circuit comprises: a first pull-up control module comprising: a first transistor, having a gate receiving a control signal, a source receiving a starting signal, and a drain electrically connected to a first node; wherein when the first transistor is turned off, a voltage level of the gate of the first transistor is lower than a voltage level of the source; the source of the first transistor is an end for signal inputting; and the drain of the first transistor is an end for signal outputting.

Optionally, the first transistor is an N-type transistor and a voltage level of the control signal is lower than a voltage level of the starting signal when the voltage level of the control signal and the voltage level of the starting signal correspond to a low voltage level.

Optionally, the voltage level of the control signal is equal to the voltage level of the starting signal when the voltage level of the control signal and the voltage level of the starting signal correspond to a high voltage level.

Optionally, the first transistor is a P-type transistor and a voltage level of the control signal is lower than a voltage level of the starting signal when the voltage level of the control signal and the voltage level of the starting signal correspond to a high voltage level.

Optionally, the GOA circuit further comprises a plurality of second GOA units. The first GOA unit and the plurality of second GOA units are cascaded. Each of the plurality of second GOA units comprises a second pull-up control module that comprises a second transistor, having a gate receiving a $(N-M)^{th}$-stage stage signal, a source receiving a $(N-M)^{th}$-stage scan signal, and a drain electrically connected to a second node. M and N are integers and N is greater than M.

Optionally, the GOA circuit further comprises M cascaded the first GOA units.

Optionally, the second GOA unit further comprises a reset module, electrically connected to the first node, configured to receive a reset signal and a first low reference signal and to initialize a voltage level of the first node under a control of the reset signal. The control signal and the reset signal are a same signal.

Optionally, the reset module comprises a reset transistor, having a gate receiving the reset signal, a source receiving the first low reference signal, and a drain electrically connected to the second node.

Optionally, the second GOA unit further comprises: a pull-up module, electrically connected to the second node, a stage signal output end of a current stage and a scan signal output end of the current stage, configured to receive a high-frequency clock signal and output a stage signal of the current stage and a scan signal of the current stage under a control of a voltage level of the second node; a pull-down module, electrically connected to the second node, configured to receive the $(N+M)^{th}$-stage scan signal and the first low reference signal and to pull down a voltage level of the second node under a control of the $(N+M)^{th}$-stage scan signal and the first low reference signal; and a pull-down maintaining module, electrically connected to the second node and the scan signal output end of the current stage, configured to receive a first low-frequency clock signal, a second low-frequency clock signal, the first low reference signal and a second low reference signal and to maintain the voltage level of the second node and a voltage level of the scan signal of the current stage as a voltage level of the first low reference signal after the pull-down module pulls down the voltage level of the second node.

Optionally, the first GOA unit further comprises: a pull-up module, electrically connected to the first node, a stage signal output end of a current stage and a scan signal output end of the current stage, configured to receive a high-frequency clock signal and output a stage signal of the current stage and a scan signal of the current stage under a control of a voltage level of the first node; a pull-down module, electrically connected to the first node, configured to receive a $(N+M)^{th}$-stage scan signal and a first low reference signal and to pull down the voltage level of the first node under a control of the $(N+M)^{th}$-stage scan signal and the first low reference signal; and a pull-down maintaining module, electrically connected to the first node and the scan signal output end of the current stage, configured to receive a first low-frequency clock signal, a second low-frequency clock signal, the first low reference signal and a second low reference signal and to maintain the voltage level of the first node and a voltage level of the scan signal of the current stage as a voltage level of the first low reference signal after the pull-down module pulls down the voltage level of the first node.

Optionally, the pull-up module comprises a third transistor, a fourth transistor, and a bootstrap capacitor. A gate of the third transistor, a gate of the fourth transistor and an end of the bootstrap capacitor are all electrically connected to the first node; a source of the third transistor, a source of the fourth transistor receive the high-frequency clock signal; a drain of the third transistor is electrically connected to the stage signal output end of the current stage; and a drain of the fourth transistor and another end of the bootstrap capacitor are both electrically connected to the scan signal output end of the current stage. The pull-down module comprises a fifth transistor, having a gate receiving the $(N+M)^{th}$-stage scan signal, a source receiving the first low reference signal, and a drain electrically connected to the first node.

Optionally, the pull-down maintaining module comprises: a pull-down maintaining unit, comprising a $6^{th}$ transistor, a $7^{th}$ transistor, an $8^{th}$ transistor, a $9^{th}$ transistor, a $10^{th}$ transistor and a $11^{th}$ transistor; and a second pull-down maintaining unit, comprising a $12^{th}$ transistor, a $13^{th}$ transistor, a $14^{th}$ transistor, a $15^{th}$ transistor, a $16^{th}$ transistor and a $17^{th}$ transistor. A gate of the $6^{th}$ transistor, a source of the $6^{th}$ transistor and a source of the $9^{th}$ transistor receive the first low-frequency clock signal; a drain of the $6^{th}$ transistor, a gate of the $9^{th}$ transistor and a drain of the $11^{th}$ transistor are connected to each other; a drain of the $9^{th}$ transistor, a gate of the $7^{th}$ transistor, a gate of the $8^{th}$ transistor and a drain of the $10^{th}$ transistor are connected to each other; a drain of the $7^{th}$ transistor, a gate of the $10^{th}$ transistor and a gate of the $11^{th}$ transistor are electrically connected to the first node; a source of the $7^{th}$ transistor, a source of the $10^{th}$ transistor and a source of the $11^{th}$ transistor receive the first low reference signal; a source of the $8^{th}$ transistor receives the second low reference signal; and a drain of the $8^{th}$ transistor is electrically connected to the scan signal output end of the current stage. A gate of the $12^{th}$ transistor, a source of the $12^{th}$ transistor and a source of the $15^{th}$ transistor receive the second low-frequency clock signal; a drain of the $12^{th}$ transistor. A gate of the $15^{th}$ transistor and a drain of the $17^{th}$ transistor are connected to each other; a drain of the $15^{th}$ transistor, a gate of the $13^{th}$ transistor. A gate of the $14^{th}$ transistor and a drain of the $16^{th}$ transistor are connected to each other; a drain of the $14^{th}$ transistor. A gate of the $16^{th}$ transistor and a gate of the $17^{th}$ transistor are electrically connected to the first node. A source of the $13^{th}$ transistor, a source of the $16^{th}$ transistor and a source of the $17^{th}$ transistor receive the first low reference signal. A source of the $14^{th}$ transistor receives the second low reference signal; and a drain of the $14^{th}$ transistor is electrically connected to the scan signal output end of the current stage.

Optionally, the first pull-down maintaining unit and the second pull-down maintaining unit alternatively works.

Optionally, a voltage level of the first low reference signal is lower than a voltage level of the second low reference signal; a voltage level of the control signal is equal to the voltage level of the first low reference signal when the control signal corresponds to a low voltage level; and a voltage level of the starting signal is equal to the voltage level of the second low reference signal when the starting signal corresponds to a low voltage level.

According to an embodiment of the present disclosure, a gate driver on array (GOA) circuit is disclosed. The GOA circuit includes a first GOA unit and a plurality of second GOA units. The first GOA unit and the plurality of second GOA units are cascaded. The first GOA circuit comprises: a first pull-up control module, comprising: a first transistor, having a gate receiving a control signal, a source receiving a starting signal, and a drain electrically connected to a first node, wherein when the first transistor is turned off, a voltage level of the gate of the first transistor is lower than a voltage level of the source; the source of the first transistor is an end for signal inputting; and the drain of the first transistor is an end for signal outputting; a first pull-up module, electrically connected to the first node, a stage signal output end of a current stage and a scan signal output end of the current stage, configured to receive a high-frequency clock signal and output a stage signal of the current stage and a scan signal of the current stage under a control of a voltage level of the first node; a first pull-down module, electrically connected to the first node, configured to receive a $(N+M)^{th}$-stage scan signal and a first low reference signal and to pull down the voltage level of the first node under a control of the $(N+M)^{th}$-stage scan signal and the first low reference signal; and a first pull-down maintaining module, electrically connected to the first node and the scan signal output end of the current stage, configured to receive a first low-frequency clock signal, a second low-frequency clock signal, the first low reference signal and a second low reference signal and to maintain the voltage level of the first node and a voltage level of the scan signal of the current stage as a voltage level of the first low reference signal after the pull-down module pulls down the voltage level of the first node. Each of the plurality of second GOA units comprises a second pull-up control module, comprising: a second transistor, having a gate receiving a $(N-M)^{th}$-stage stage signal, a source receiving a $(N-M)^{th}$-stage scan signal, and a drain electrically connected to a second node; a second pull-up module, electrically connected to the second node, a stage signal output end of a current stage and a scan signal output end of the current stage, configured to receive a high-frequency clock signal and output a stage signal of the current stage and a scan signal of the current stage under a control of a voltage level of the second node; a second pull-down module, electrically connected to the second node, configured to receive the $(N+M)^{th}$-stage scan signal and the first low reference signal and to pull down a voltage level of the second node under a control of the $(N+M)^{th}$-stage scan signal and the first low reference signal; and a first pull-down maintaining module, electrically connected to the second node and the scan signal output end of the current stage, configured to receive a first low-frequency clock signal, a second low-frequency clock signal, the first low reference signal and a second low reference signal and to maintain the voltage level of the second node and a voltage level of the scan signal of the current stage as a voltage level of the first low reference signal after the pull-down module pulls down the voltage level of the second node, where M and N are integers and N is greater than M.

Optionally, the first transistor is an N-type transistor and a voltage level of the control signal is lower than a voltage level of the starting signal when the voltage level of the control signal and the voltage level of the starting signal correspond to a low voltage level.

Optionally, the voltage level of the control signal is equal to the voltage level of the starting signal when the voltage level of the control signal and the voltage level of the starting signal correspond to a high voltage level.

Optionally, the first transistor is a P-type transistor and a voltage level of the control signal is lower than a voltage level of the starting signal when the voltage level of the control signal and the voltage level of the starting signal correspond to a high voltage level.

Optionally, the second GOA unit further comprises a reset module, electrically connected to the first node, configured to receive a reset signal and a first low reference signal and to initialize a voltage level of the first node under a control of the reset signal. The control signal and the reset signal are a same signal.

Optionally, the reset module comprises a reset transistor, having a gate receiving the reset signal, a source receiving the first low reference signal, and a drain electrically connected to the second node.

The present disclosure provides a gate driver on array (GOA) circuit that includes a first GOA unit. The first GOA circuit includes a first pull-up control module that includes a first transistor, having a gate receiving a control signal, a source receiving a starting signal, and a drain electrically connected to a first node. When the first transistor is turned off, a voltage level of the gate of the first transistor is lower than a voltage level of the source; the source of the first transistor is an end for signal inputting; and the drain of the first transistor is an end for signal outputting. The GOA circuit of the present disclosure respectively connects the gate and the source of the first transistor to the control signal and the starting signal and sets the voltage levels of the control signal and the starting signal when they correspond to a high voltage level or a low voltage level. In this way, when the first transistor is turned off, the voltage level of the gate of the first transistor is lower than the voltage level of the source of the first transistor. This could make sure that the first transistor is completely turned off. Accordingly, the present disclosure could reduce the leakage current of the first transistor and raise the yield of the first GOA unit in order to reduce the leakage current of the GOA circuit and raise the stability of the GOA circuit.

BRIEF DESCRIPTION OF THE SEVERAL VIEWS OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF SPECIFIC EMBODIMENTS OF THE INVENTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

This present disclosure provides a GOA circuit, which will be described in detail below. It should be noted that the description order of the following embodiments is not intended to limit the preferred order of the embodiments of the present disclosure.

Because the source and the drain of the transistor in the following disclosure are symmetric, the source and the drain are interchangeable. In the present disclosure, in order to distinguish the two electrodes other than the gate, one of the electrodes is called the source and the other of the electrodes is called the drain. In this disclosure, the middle end of the switch transistor is designated as the gate, the signal input end of the switch transistor is designated as the source, and the signal output end of the switch transistor is designated as the drain.

Figure 1:
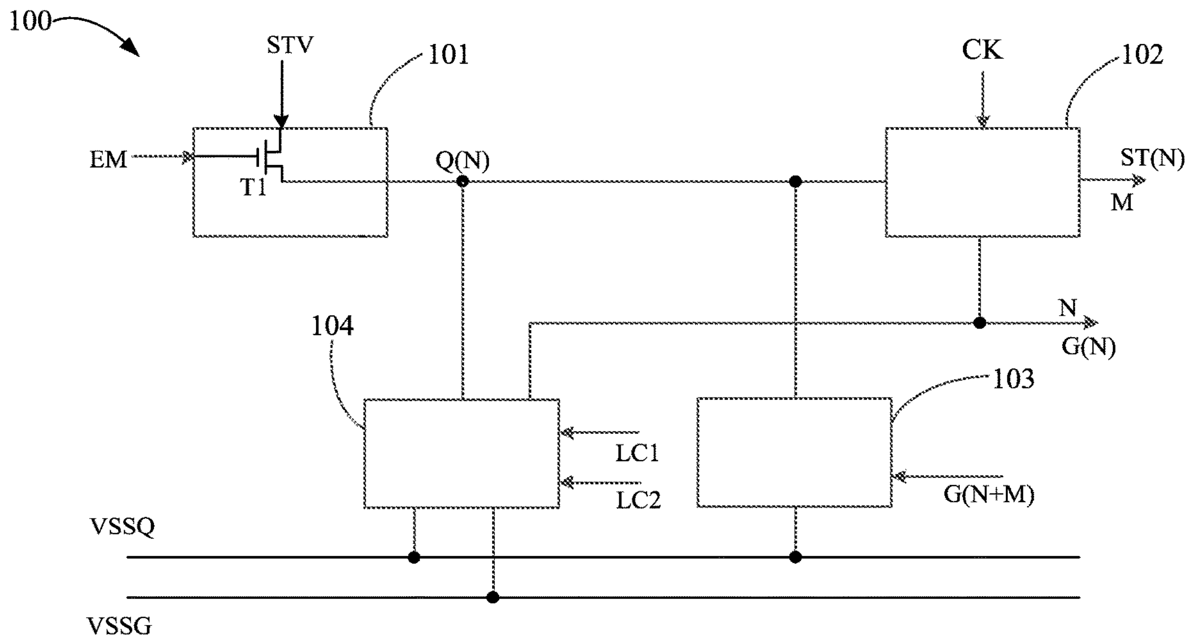
FIG. 1 is a functional block diagram of a first GOA unit according to an embodiment of the present disclosure.

Please refer to FIG. 1. FIG. 1 is a functional block diagram of a first GOA unit according to an embodiment of the present disclosure. The GOA circuit comprises a plurality of first GOA units 100. The first GOA unit 100 comprises a first pull-up control module 101 and a first node Q(N). The first control module 101 receives the control signal EM and the starting signal STV and is electrically connected to the first node Q(N). The first pull-up control module 101 is configured to output the starting signal STV to the first node Q(N) under the control of the control signal EM.

Specifically, the first pull-up control module 101 comprises a first transistor T1. The gate of the first transistor T1 receives the control signal EM. The source of the first transistor T1 receives the starting signal STV. The drain of the first transistor T1 is electrically connected to the first node Q(N).

In the present disclosure, the gate of the first transistor T1 receives the control signal EM and the source of the first transistor T1 receives the starting signal STV. When the first transistor T1 is turned off, the voltage levels of the control signal and the starting signal are set to make the voltage level of the gate of the first transistor T1 lower than the source of the first transistor T1. In this way, the first transistor T1 is completely turned off and the leakage current is reduced. Therefore, the present disclosure could reduce the defect rate of the first GOA unit 100, reduce the leakage current of the GOA circuit and raise the stability of the GOA circuit. In addition, the present disclosure could further avoid the differences among the scan signals and the display line defects, which are caused by the leakage currents.

The voltage levels of the control signal EM and the starting signal STV when they correspond to a high voltage level or a low voltage level could be designed according to the type of the first transistor T1 and the threshold voltage of the first transistor T1 to make sure that the first transistor T1 could be correctly turned on and sufficiently turned off.

The transistor, in this embodiment, could be a P-type transistor or an N-type transistor. The P-type transistor is turned on when a low voltage is applied on the gate and is cut-off when a high voltage is applied on the gate. The N-type transistor is turned on when a high voltage is applied on the gate and is cut-off when a low voltage is applied on the gate.

The first transistor T1 is an N-type transistor. At this time, the voltage level of the control signal EM is lower than the voltage level of the starting signal STV when the control signal EM and the starting signal STV both correspond to a low voltage level. When the control signal EM and the starting signal STV both correspond to a low voltage level, the first transistor T1 is turned off. At this time, because the voltage between the gate and the source is lower than 0 (Vgs<0), it could ensure that the first transistor T1 is completely turned off to avoid the leakage current of the first transistor T1. This could reduce the defect rate of the first GOA unit 100 and raise the stability of the GOA circuit.

In an embodiment, the first transistor T1 is an N-type transistor. In this case, the voltage level of the control signal EM is equal to the voltage level of the starting signal STV when the control signal EM and the starting signal STV both correspond to a high voltage level. It could be understood that in a display device, logic circuits need to be used to determine whether the signals in the GOA circuit correspond to a high voltage level or a low voltage level. In this embodiment, by setting the voltage level of the control signal EM equal to the voltage level of the starting signal STV when the control signal EM and the starting signal STV both correspond to a high voltage level, the logic circuits could be simplified and reduce the signal complexity in the GOA circuit.

In another embodiment, the voltage level of the control signal EM could be lower than or larger than the voltage level of the starting signal STV when the control signal EM and the starting signal STV both correspond to a high voltage level.

In another embodiment, the first transistor T1 is a P-type transistor. In this case, the voltage level of the control signal EM is lower than the voltage level of the starting signal STV when the control signal EM and the starting signal STV both correspond to a high voltage level. When the control signal EM and the starting signal STV both correspond to a high voltage level, the first transistor T1 is turned off. Similarly, because the voltage difference between the gate and the source is lower than 0 (Vgs<0), it could ensure that the first transistor is completely turned off to avoid leakage currents of the first transistor T1. This could further reduce the defect rate of the first GOA unit 100 and raise the stability of the GOA circuit.

In the following embodiment, all of the transistors are N-type transistors. However, this is not a limitation of the present disclosure.

Please refer to FIG. 1. The first GOA unit 100 further comprises a pull-up module 102, a pull-down module 103 and a pull-up maintaining module 104.

The pull-up module 102 receives a high-frequency clock signal CK and is electrically connected to the first node Q(N), a stage signal output end M of the current stage and a scan signal output end N of the current stage. The pull-up module 102 is configured to output a stage signal ST(N) of the current stage and a scan signal of the current stage G(N) under the control of the voltage level of the first node Q(N).

The pull-down module 103 receives a $(N+M)^{th}$-stage scan signal G(N+M) and a first low reference signal VSSQ and is electrically connected to the first node Q(N). The pull-down module 103 is configured to pull down the voltage level of the first node Q(N) under the control of the $(N+M)^{th}$-stage scan signal G(N+M) and the first low reference signal VSSQ.

The pull-down maintaining module 104 receives a first low-frequency clock signal LC1, a second low-frequency clock signal LC2, the first low reference signal VSSQ and the second low reference signal VSSG and is electrically connected to the first node Q(N) and the scan signal output end N of the current stage, The pull-down maintaining module 104 is configured to maintain the voltage level of the first node Q(N) and the voltage level of the scan signal of the current stage G(N) as the voltage level of the first low reference signal VSSQ after the pull-down module pulls down the voltage level of the first node Q(N).

Figure 2:
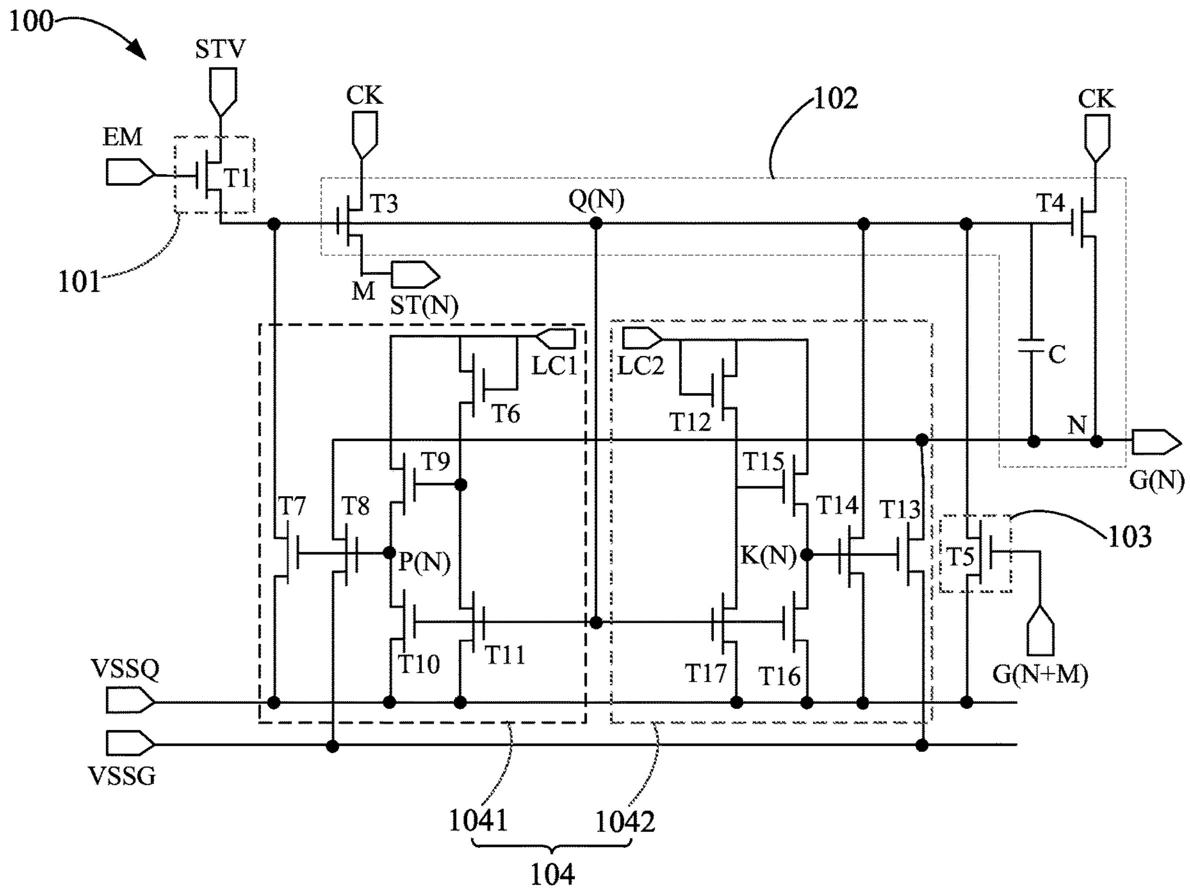
FIG. 2 is a circuit diagram of a first GOA unit according to an embodiment of the present disclosure.

Please refer to FIG. 2. FIG. 2 is a circuit diagram of the first GOA unit shown in FIG. 1. As previously mentioned, the first pull-up control module comprises the first transistor T1. However, this is not a limitation of the present disclosure. For example, the first pull-up control module 101 could further comprise at least one transistor connected in parallel with the first transistor T1. Through the alternative work of multiple transistors, the bias applied on the transistor could be further reduced. For example, the first pull-up control module 101 could further comprise at least one transistor connected in series with the first transistor T1.

The pull-up module 102 comprises a third transistor T3, a fourth transistor T4 and a bootstrap capacitor C. The gate of the third transistor T3, the gate of the fourth transistor T4 and an end of the bootstrap capacitor C are all electrically connected to the first node Q(N). The source of the third transistor T3, the source of the fourth transistor T4 receive the high-frequency clock signal CK. The drain of the third transistor T3 is electrically connected to the stage signal output end M of the current stage. The drain of the fourth transistor T4 and another end of the bootstrap capacitor C are both electrically connected to the scan signal output end N of the current stage.

The pull-down module 103 comprises a fifth transistor T5. The gate of the fifth transistor T5 receives the $(N-M)^{th}$-stage scan signal G(N). The source of the fifth transistor T5 receives the first low reference signal VSSQ. The drain of the fifth transistor T5 is electrically connected to the first node Q(N).

The pull-down maintaining unit 104 comprises a first pull-down maintaining unit 1041 and a second pull-down maintaining unit 1042. The pull-down maintaining unit 1041 and the second pull-down maintaining unit 1042 maintains the voltage level of the first node Q(N) and the voltage level of the scan signal of the current stage G(N) after the pull-down module 103 pulls down the voltage level of the first node Q(N) and the voltage level of the scan signal of the current stage G(N).

The pull-down maintaining unit 1041 comprises a $6^{th}$ transistor T6, a $7^{th}$ transistor T7, an $8^{th}$ transistor T8, a $9^{th}$ transistor T9, a $10^{th}$ transistor T10 and a $11^{th}$ transistor T11. The gate of the $6^{th}$ transistor T6, the source of the $6^{th}$ transistor T6 and the source of the $9^{th}$ transistor T9 receive the first low-frequency clock signal LC1. The drain of the $6^{th}$ transistor T6, the gate of the $9^{th}$ transistor T9 and the drain of the $11^{th}$ transistor T11 are connected to each other. The drain of the $9^{th}$ transistor T9, the gate of the $7^{th}$ transistor T7, the gate of the $8^{th}$ transistor T8 and the drain of the $10^{th}$ transistor T10 are connected to each other. The drain of the $7^{th}$ transistor T7, the gate of the $10^{th}$ transistor T10 and the gate of the $11^{th}$ transistor T11 are electrically connected to the first node Q(N). The source of the $7^{th}$ transistor T7, the source of the $10^{th}$ transistor T10 and the source of the $11^{th}$ transistor T11 receive the first low reference signal VSSQ. The source of the $8^{th}$ transistor T8 receives the second low reference signal VSSG. The drain of the $8^{th}$ transistor T8 is electrically connected to the scan signal output end N of the current stage.

The second pull-down maintaining unit 1042 comprises a $12^{th}$ transistor T12, a $13^{th}$ transistor T13, a $14^{th}$ transistor T14, a $15^{th}$ transistor T15, a $16^{th}$ transistor T16 and a $17^{th}$ transistor T17. The gate of the $12^{th}$ transistor T12, the source of the $12^{th}$ transistor T12 and the source of the $15^{th}$ transistor T15 receive the second low-frequency clock signal LC2. The drain of the $12^{th}$ transistor T12, the gate of the $15^{th}$ transistor T15 and the drain of the $17^{th}$ transistor T17 are connected to each other. The drain of the $15^{th}$ transistor T15, the gate of the $13^{th}$ transistor T13, the gate of the $14^{th}$ transistor T14 and the drain of the $16^{th}$ transistor T16 are connected to each other. The drain of the $14^{th}$ transistor T14, the gate of the $16^{th}$ transistor T16 and the gate of the $17^{th}$ transistor T17 are electrically connected to the first node Q(N). The source of the $13^{th}$ transistor T13, the source of the $16^{th}$ transistor T16 and the source of the $17^{th}$ transistor T17 receive the first low reference signal VSSQ.

The source of the $14^{th}$ transistor T14 receives the second low reference signal VSSG. The drain of the $14^{th}$ transistor T14 is electrically connected to the scan signal output end N of the current stage.

The first pull-down maintaining unit 1041 and the second pull-down maintaining unit 1042 are symmetrically placed and are both used for maintaining the low voltage level of the first node Q(N) and the scan signal of the current stage G(N). This arrangement raises the uniformity and the stability of the GOA circuit.

Please note, the pull-down maintaining unit 1041 and the second pull-down maintaining unit 1042 could work at the same time to maintain the low voltage level of the first node Q(N) and the scan signal of the current stage G(N). Surely, the pull-down maintaining unit 1041 and the second pull-down maintaining unit 1042 could be controlled to work alternatively through controlling the first low frequency clock signal LC1 and the second low frequency clock signal LC2. This could increase the lifetime of the GOA circuit.

Figure 3:
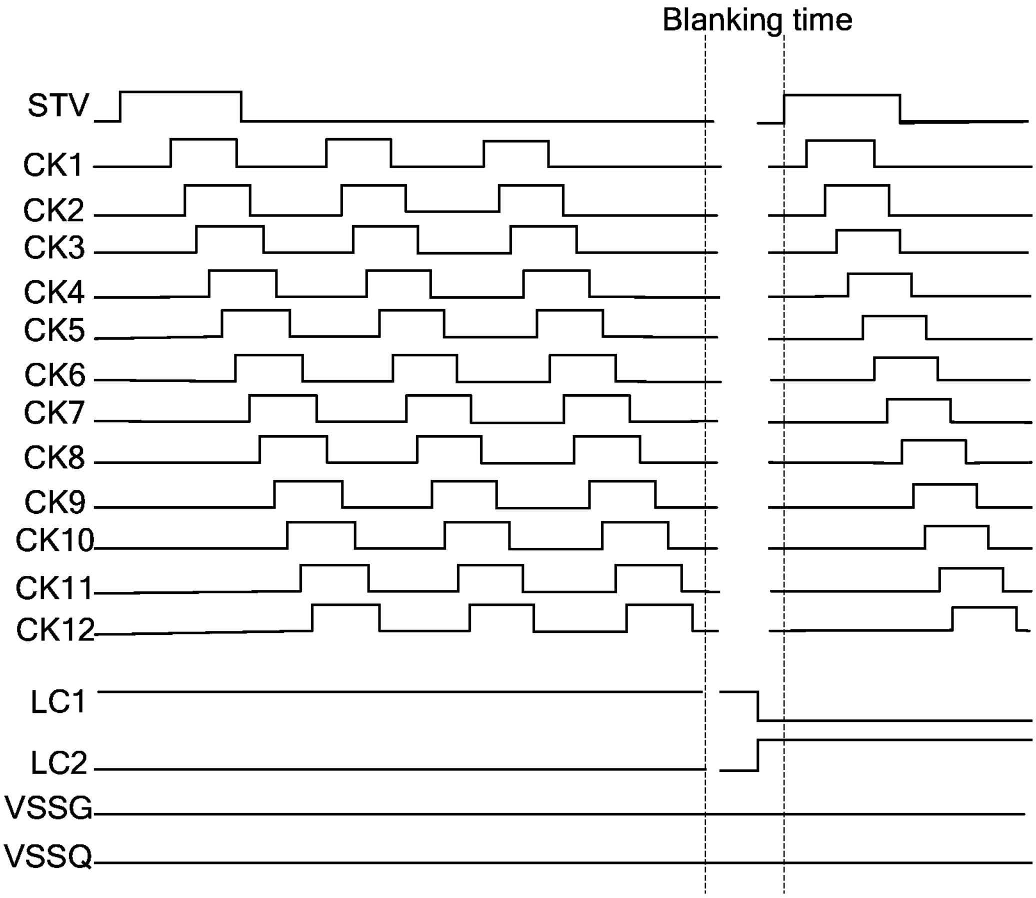
FIG. 3 is a timing diagram of a first GOA unit according to an embodiment of the present disclosure.
Figure 4:
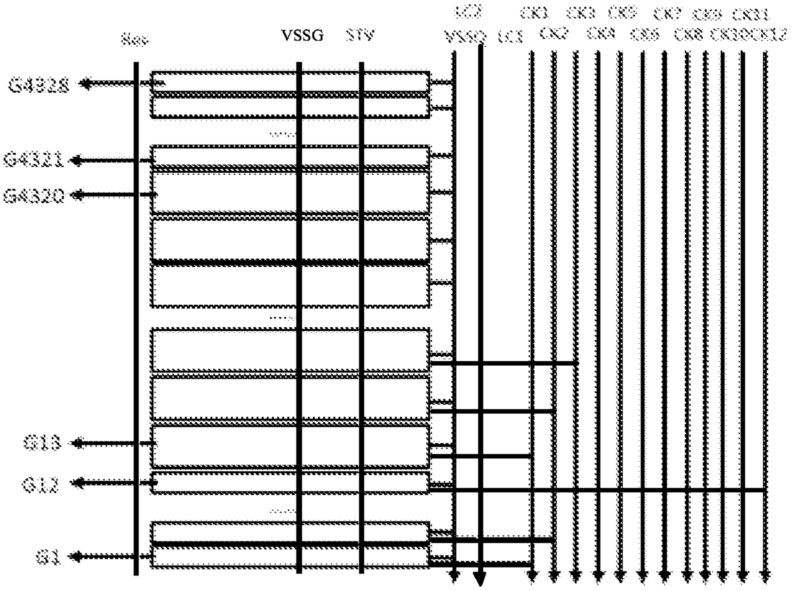
FIG. 4 is a diagram of a layout of a GOA circuit according to an embodiment of the present disclosure.

Please refer to FIG. 2-FIG. 4. FIG. 3 is a timing diagram of the first GOA unit according to an embodiment of the present disclosure. FIG. 4 is a diagram of a layout of the GOA circuit according to an embodiment of the present disclosure. Here, a 12CK signal GOA circuit is used as an example for illustration, but is not a limitation of the present disclosure.

In this embodiment, the GOA circuit has 12 high-frequency clock signals (CK1-CK12). These high-frequency clock signals CK1-CK12 have the same waveform but different timings. In the blanking time interval (the blanking time period between adjacent frames), the high-frequency clock signals CK1-CK12 all correspond to a low voltage level. Because of the arrangement of the high-frequency clock signals CK1-CK12, every 12 GOA units becomes a stage circle in the GOA circuit.

As shown in FIG. 3, when the first low-frequency clock signal LC1 is in its transition, the second low frequency clock signal LC2 corresponds to a low voltage level. When the second low frequency clock signal LC2 is in its transition, the first low-frequency clock signal LC1 corresponds to a low voltage level. This ensures that the first pull-down maintaining unit 1041 and the second maintaining unit 1042 could work alternatively.

The operations of the first GOA unit 100 are: when the control signal EM and the starting signal STV rise to become a high voltage level, the first transistor T1 is turned on. The voltage level of the first node Q(N) is pulled up such that the third transistor T3 and the fourth transistor T4 are turned on. And then, the high-frequency clock signal CK is switched from a low voltage level to a high voltage level such that the stage signal of the current stage ST(N) is outputted from the stage signal output end M of the current stage through the third transistor T3 and the scan signal of the current stage G(N) is outputted from the scan signal output end M of the current stage through the fourth transistor T4. And then, the $(N+M)^{th}$-stage stage signal G(M+N) rises to a high voltage level and the $5^{th}$ transistor T5 is turned on such that the first node Q(N) is connected to the first low reference signal VSSQ. That is, the voltage level of the first node Q(N) is pulled down to the voltage level of the first low reference signal VSSQ. At this time, because the voltage level of the first node Q(N) is pulled down to the voltage level of the first low reference signal VSSQ, the $10^{th}$ transistor T10 and the $11^{th}$ transistor T11 are turned off. Finally, the first low-frequency clock signal LC1 or the second low-frequency clock signal LC2 rise to the high voltage level. The $6^{th}$ transistor T6 and the $9^{th}$ transistor are turned on. The voltage level of the third node P(N) or the voltage level of the fourth node K(N) rise. Because of this, the $7^{th}$ transistor and the $8^{th}$ transistor are turned on such that the first node Q(N) is connected to the first low reference signal VSS and the scan signal output end N of the current stage and the second low reference signal VSSG. That is, the voltage level of the first node Q(N) is maintained at the voltage level of the first low reference signal VSSQ and the scan signal of the current stage G(N) is maintained at the first low reference signal VSSQ.

Optionally, the voltage level of the first low reference signal VSSQ is lower than the voltage level of the second low reference signal VSSG.

From the above, it can be understood that when the $(N+4)^{th}$-stage scan signal G(N+M) rises to a high voltage level, the $5^{th}$ transistor T5 is turned on to pull down the voltage level of the first node Q(N) to the voltage level of the first low reference signal VSSQ. And then, taking the first low-frequency clock signal LC1 rises to a high voltage level as an example, the $6^{th}$ transistor T6 and the $9^{th}$ transistor T9 are turned on and the voltage level of the third node P(N) is pulled up. Because of this, the $7^{th}$ transistor T7 and the $8^{th}$ transistor T8 are turned on to main the voltage level of the first node Q(N) at the voltage level of the first low reference signal VSSQ and maintain the voltage level of the scan signal G(N) of the current stage at the voltage level of the first low reference signal VSSQ. Here, the voltage difference between the gate and the source of the $4^{th}$ transistor is equal to the voltage difference between the first low reference signal VSSQ and the second low reference signal VSSG. The difference between the gate and the source of the fourth transistor is lower than 0 and thus the fourth transistor T4 could be completely turned off such that the fourth transistor T4 does not have any leakage current. This could reduce the leakage current of the GOA circuit.

Figure 5:
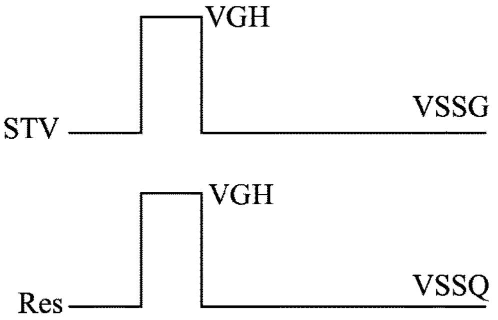
FIG. 5 is a timing diagram of a control signal and a reset signal according to an embodiment of the present disclosure.

Please refer to FIG. 5. FIG. 5 is a timing diagram of a control signal and a reset signal according to an embodiment of the present disclosure. Here, the voltage level of the control signal EM is equal to the voltage level of the second low reference signal when the control signal EM corresponds to a low voltage level. The voltage level of the starting signal STV is equal to the voltage level of the first low reference signal VSSQ when the starting signal STV corresponds to a low voltage level.

The voltage level of the starting signal STV could be 30.5 V when the starting signal STV corresponds to a high voltage level. The voltage level of the starting signal STV could be −12 V when the starting signal STV corresponds to a low voltage level. The voltage level of the first low reference signal VSSQ is −12V and the voltage level of the second low reference signal VSSG is −6V.

In this embodiment, the low voltage level of the control signal EM is set to be the same as the voltage level of the second low reference signal VSSG and the low voltage level of the starting signal STV is set to be the same as the voltage level of the first low reference signal VSSQ. This could reduce the signal complexity of the GOA circuit.

In addition, the voltage level of the control signal EM and the voltage level of the starting signal STV could be the same as the voltage level of the high voltage source VGH of the display panel when the control signal EM and the starting signal STV correspond to a high voltage level.

Figure 6:
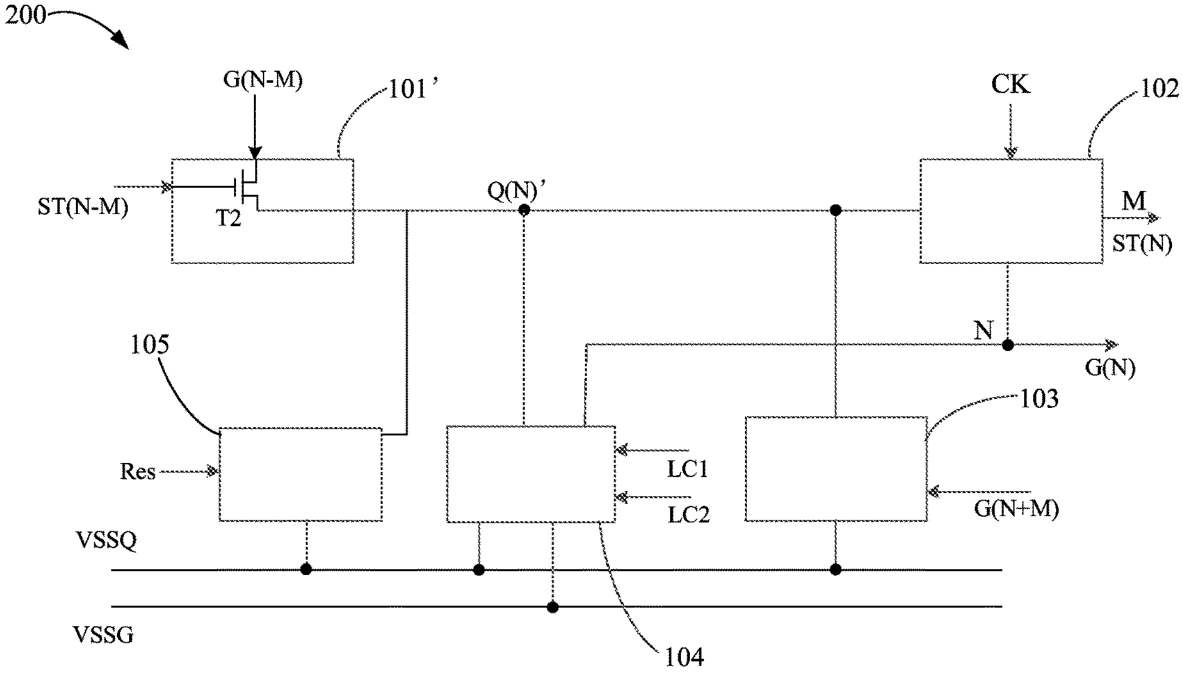
FIG. 6 is a functional block diagram of a second GOA unit according to an embodiment of the present disclosure.
Figure 7:
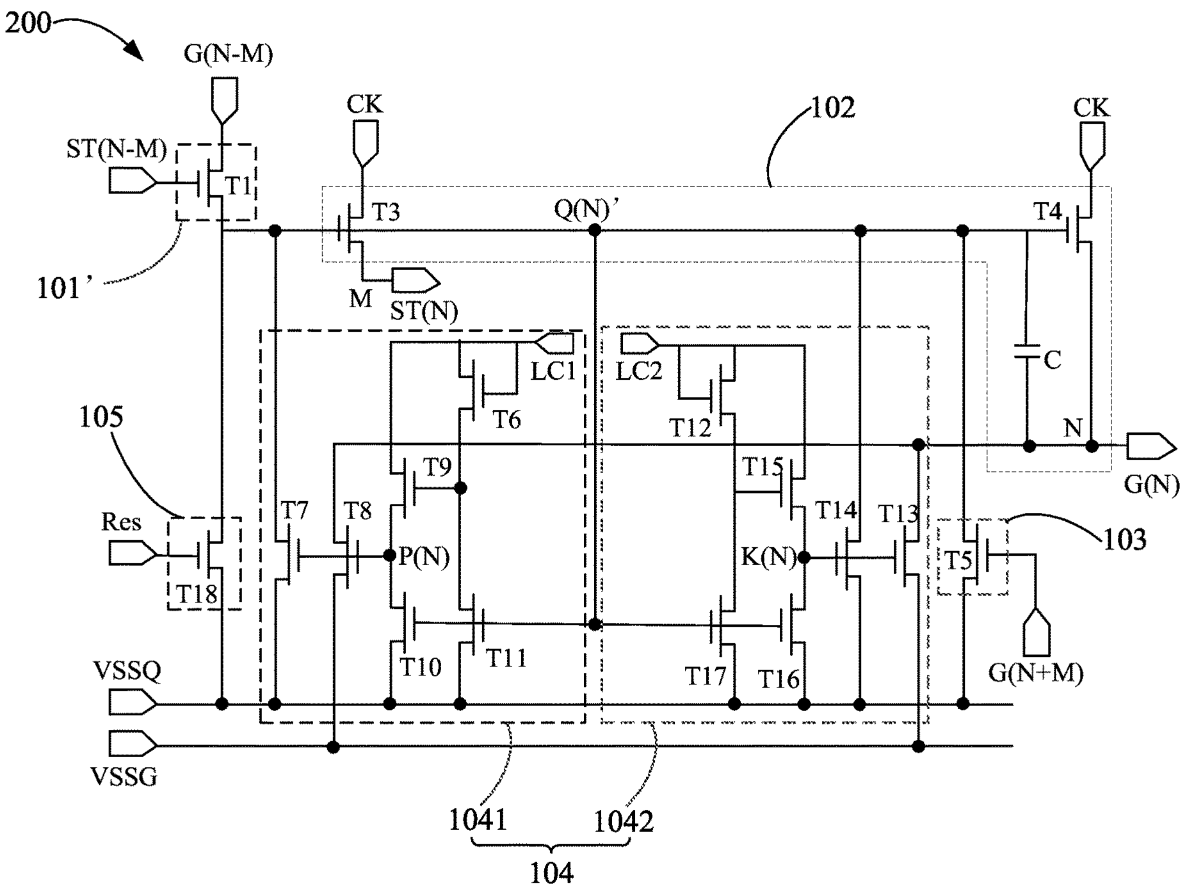
FIG. 7 is a circuit diagram of a second GOA unit according to an embodiment of the present disclosure.

In the present disclosure, the GOA circuit comprises a second GOA unit 200. The first GOA unit 100 and the plurality of GOA units 200 are cascaded. Please refer to FIG. 6 and FIG. 7. FIG. 6 is a functional block diagram of the second GOA unit according to an embodiment of the present disclosure. FIG. 7 is a circuit diagram of the second GOA unit according to an embodiment of the present disclosure.

The second GOA unit 200 comprises a second pull-up control module 101' and a second node Q(N)'. The gate of the second transistor T2 receives a $(N-M)^{th}$-stage stage signal ST(N−M). The source of the second transistor T2 receives a $(N-M)^{th}$-stage scan signal G(N−M). The drain of the second transistor T2 is electrically connected to a second node Q(N)'. M and N are integers and N is greater than M.

The GOA circuit comprises the first GOA units 100 and the second GOA units 200. The first GOA units 100 are the first to the $M^{th}$ GOA units. The second GOA units 200 are the $(M+1)^{th}$ to the Nth GOA units. Here, the first GOA unit 100 is a starting GOA unit. The second GOA unit 200 is the regular GOA unit. The different between the starting GOA unit and the regular GOA unit is that in the regular GOA unit, the first pull-up control module 101 receives the $(N-M)^{th}$-stage stage signal ST(N−M) and the $(N-M)^{th}$-stage scan signal G(N−M) such that the regular GOA unit works under the control of the $(N-M)^{th}$-stage stage signal ST(N−M) and the $(N-M)^{th}$-stage scan signal G(N−M). Because N>M, the $(N-M)^{th}$-stage stage signal ST(N−M) and the $(N-M)^{th}$-stage scan signal G(N−M) are already generated and could be used to control the second pull-up control module 101'. The second pull-up control module 101' does not need to receive the same starting signal STV and thus would not introduce the leakage current.

In contrast, in the starting GOA unit, the value (N−M) is lower than or equal to 0. That is, the $(N-M)^{th}$-stage stage signal ST(N−M) and the $(N-M)^{th}$-stage scan signal G(N−M) are not yet generated and cannot be used to control the first pull-up control module 101. At this time, the starting signal STV is used to replace the $(N-M)^{th}$-stage stage signal ST(N−M) and the $(N-M)^{th}$-stage scan signal G(N−M). However, if the starting signal STV is used to control the first pull-up control module 101, the voltage difference between the gate and the source of the first transistor T1 is equal to 0 (Vgs=0) when the first transistor T1 is turned off. This means that the first transistor T1 may have leakage current and thus the first GOA unit 100 does not have a good performance.

In the present disclosure, in the first GOA unit 100, the $(N-M)^{th}$-stage stage signal ST(N−M) is replaced by the control signal EM and the $(N-M)^{th}$-stage scan signal G(N−M) is replaced by the starting signal STV. Furthermore, the voltage level of the control signal EM and the voltage level of the starting signal STV are set such that the voltage level of the gate of the first transistor T1 is lower than the voltage level of the source of the first transistor T1. This reduces the leakage currents of the first pull-up control module 101 in the first M stages of the GOA units, reduces the defect rate of the first GOA units 100 and raises the stability of the GOA circuit.

In the present disclosure, the value N could be set according to the driving method and the number of the scan lines of the display panel. The value M could be set according to the driving mechanism of the display panel. For example, in an ordinary 8CK signal GOA circuit, the first four stages of GOA units are the starting stage (that is, M=4). In an ordinary 14 CK signal GOA circuit, the first 6 stages of GOA units are the starting stage (that is, M=6).

In an ordinary 16 CK signal GOA circuit, the first 8 stages of GOA units are the starting stage (that is, M=8).

The second GOA unit 200 further comprises a reset module 105. The reset module 105 receives a reset signal Res and the first low reference signal VSSQ and is electrically connected to the second node Q(N)'. The reset module 105 is configured to initialize the voltage level of the second node Q(N)' under the control of the reset signal Res.

The reset module 105 comprises: a reset transistor T18, having a gate receiving the reset signal Res, a source receiving the first low reference signal VSSQ, and a drain electrically connected to the second node Q(N)'.

Each of the second GOA units 200 comprises a pull-up module 102, a pull-down module 103 and a pull-down maintaining module 104. The structures of the pull-up module 102, the pull-down module 103 and the pull-down maintaining module 104 are identical to the modules in the first GOA unit 100. In addition, the position of the second node Q(N)' is similar to the position of the first node Q(N) and the connection relationship among the pull-up module 102, the pull-down module 103 and the pull-down maintaining module 104 are similar to the modules in the first GOA unit 100. The operations of the second GOA unit 200 are similar to the operations of the first GOA unit 100. Further illustrations are omitted here for simplicity.

Please refer to FIG. 3. This signal timing figure is also adopted in the second GOA units 200. The only difference is: in the blanking time interval, the control signal EM corresponds to a high voltage level and the reset transistor is turned on to pull down the voltage level of the second node Q(N)' to the voltage level of the first low reference signal VSSQ. In this way, the voltage level of the second node Q(N)' could be reset to avoid an abnormal display due to the remaining charges. This further raises the stability of the GOA circuit.

Optionally, the control signal EM and the reset signal Res are the same signal such that the layout of the signal lines of the GOA circuit could be further simplified.

Figure 8:
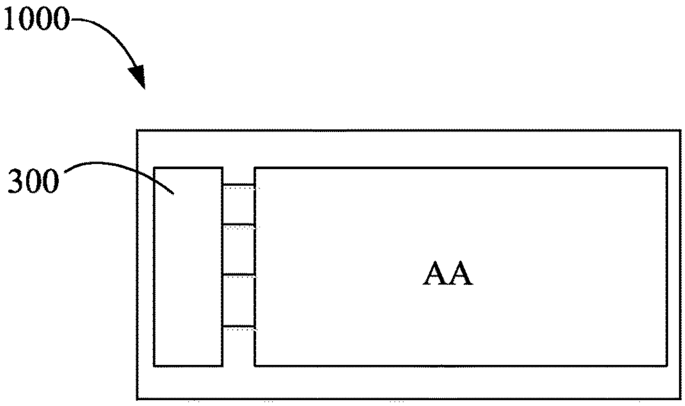
FIG. 8 is a diagram of a display panel according to an embodiment of present disclosure.

According to an embodiment of the present disclosure, a display panel is disclosed. The display panel comprises any of the above-mentioned GOA circuits. Please refer to FIG. 8. FIG. 8 is a diagram of a display panel according to an embodiment of present disclosure. The display panel 1000 comprises a display area AA and a GOA circuit 300 integrated at the edge of the display area AA. Here, the structure and the operations of the GOA circuit 300 are similar to those of the above-mentioned GOA circuit and thus further illustration is omitted here. Please note, in this embodiment, the GOA circuit is placed at one edge of the display area of the display panel 1000 to implement the one-side driving method. However, this is an example, not a limitation of the present disclosure. In some embodiments, the display panel 1000 could be driven from two sides or by other driving method according to actual demands. These changes all falls within the scope of the present disclosure.

According to an embodiment of the present disclosure, a display panel 1000 is disclosed. The display panel 1000 comprises a GOA circuit 300. The GOA circuit 300 comprises a first GOA unit. The first GOA unit comprises a first pull-up control module and a first node. The first pull-up control module comprises a first transistor. The gate of the first transistor receives a control signal. The source of the first transistor receives a starting signal. The drain of the first transistor is electrically connected to the first node. The source of the first transistor is a signal input end. The drain of the first transistor is a signal output end. The present disclosure connects the control signal and the starting signal respectively with the gate and the source of the first transistor. Furthermore, the present disclosure utilizes the control signal and the starting signal to make sure the voltage level of the gate of the first transistor is lower than that of the source of the first transistor when the first transistor is turned off such that the first transistor is completely turned off. Therefore, the present disclosure could reduce the leakage current of the first GOA unit, raise the stability of the GOA circuit 300 and ensure that the display panel 1000 could normally display.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A gate driver on array (GOA) circuit, comprising a first GOA unit and a plurality of second GOA units, the first GOA unit and the plurality of second GOA units are cascaded, wherein the first GOA circuit comprises:

a first pull-up control module, comprising:

a first transistor, having a gate receiving a control signal, a source receiving a starting signal, and a drain electrically connected to a first node;

wherein when the first transistor is turned off, a voltage level of the gate of the first transistor is lower than a voltage level of the source; the source of the first transistor is an end for signal inputting; and the drain of the first transistor is an end for signal outputting, wherein each of the plurality of second GOA units comprises:

a second pull-up control module, comprising:

a second transistor, having a gate receiving a $(N-M)^{th}$-stage stage signal, a source receiving a $(N-M)^{th}$-stage scan signal, and a drain electrically connected to a second node;

wherein the second GOA unit further comprises:

a second pull-up module, electrically connected to the second node, a stage signal output end of a current stage and a scan signal output end of the current stage, configured to receive a high-frequency clock signal and output a stage signal of the current stage and a scan signal of the current stage under a control of a voltage level of the second node;

a second pull-down module, electrically connected to the second node, configured to receive the (N+M) th-stage scan signal and the first low reference signal and to pull down a voltage level of the second node under a control of the (N+M) th-stage scan signal and the first low reference signal; and a second pull-down maintaining module, electrically connected to the second node and the scan signal output end of the current stage, configured to receive a first low-frequency clock signal, a second low-frequency clock signal, the first low reference signal and a second low reference signal and to maintain the voltage level of the second node and a voltage level of the scan signal of the current stage as a voltage level of the first low reference signal after the pull-down module pulls down the voltage level of the second node;

wherein M and N are integers and N is greater than M.

2. The GOA circuit of claim 1, wherein the first transistor is an N-type transistor and a voltage level of the control signal is lower than a voltage level of the starting signal when the voltage level of the control signal and the voltage level of the starting signal correspond to a low voltage level.

3. The GOA circuit of claim 2, wherein the voltage level of the control signal is equal to the voltage level of the starting signal when the voltage level of the control signal and the voltage level of the starting signal correspond to a high voltage level.

4. The GOA circuit of claim 1, wherein the first transistor is a P-type transistor and a voltage level of the control signal is lower than a voltage level of the starting signal when the voltage level of the control signal and the voltage level of the starting signal correspond to a high voltage level.

5. The GOA circuit of claim 1, further comprising M cascaded the first GOA units.

6. The GOA circuit of claim 1, wherein the second GOA unit further comprises:

a reset module, electrically connected to the first node, configured to receive a reset signal and a first low reference signal and to initialize a voltage level of the first node under a control of the reset signal;

wherein the control signal and the reset signal are a same signal.

7. The GOA circuit of claim 6, wherein the reset module comprises:

a reset transistor, having a gate receiving the reset signal, a source receiving the first low reference signal, and a drain electrically connected to the second node.

8. The GOA circuit of claim 1, wherein the first GOA unit further comprises:

a first pull-up module, electrically connected to the first node, a stage signal output end of a current stage and a scan signal output end of the current stage, configured to receive a high-frequency clock signal and output a stage signal of the current stage and a scan signal of the current stage under a control of a voltage level of the first node;

a first pull-down module, electrically connected to the first node, configured to receive a $(N+M)^{th}$-stage scan signal and a first low reference signal and to pull down the voltage level of the first node under a control of the $(N+M)^{th}$-stage scan signal and the first low reference signal; and a first pull-down maintaining module, electrically connected to the first node and the scan signal output end of the current stage, configured to receive a first low-frequency clock signal, a second low-frequency clock signal, the first low reference signal and a second low reference signal and to maintain the voltage level of the first node and a voltage level of the scan signal of the current stage as a voltage level of the first low reference signal after the pull-down module pulls down the voltage level of the first node.

9. The GOA circuit of claim 8, wherein the pull-up module comprises a third transistor, a fourth transistor, and a bootstrap capacitor;

wherein a gate of the third transistor, a gate of the fourth transistor and an end of the bootstrap capacitor are all electrically connected to the first node; a source of the third transistor, a source of the fourth transistor receive the high-frequency clock signal; a drain of the third transistor is electrically connected to the stage signal output end of the current stage; and a drain of the fourth transistor and another end of the bootstrap capacitor are both electrically connected to the scan signal output end of the current stage; and wherein the pull-down module comprises a fifth transistor, having a gate receiving the $(N+M)^{th}$-stage scan signal, a source receiving the first low reference signal, and a drain electrically connected to the first node.

10. The GOA circuit of claim 8, wherein the pull-down maintaining module comprises:

a pull-down maintaining unit, comprising a $6^{th}$ transistor, a $7^{th}$ transistor, an $8^{th}$ transistor, a $9^{th}$ transistor, a $10^{th}$ transistor and a $11^{th}$ transistor; and a second pull-down maintaining unit, comprising a $12^{th}$ transistor, a $13^{th}$ transistor, a $14^{th}$ transistor, a $15^{th}$ transistor, a $16^{th}$ transistor and a $17^{th}$ transistor;

wherein a gate of the $6^{th}$ transistor, a source of the $6^{th}$ transistor and a source of the $9^{th}$ transistor receive the first low-frequency clock signal; a drain of the $6^{th}$ transistor, a gate of the $9^{th}$ transistor and a drain of the $11^{th}$ transistor are connected to each other; a drain of the $9^{th}$ transistor, a gate of the $7^{th}$ transistor, a gate of the $8^{th}$ transistor and a drain of the $10^{th}$ transistor are connected to each other; a drain of the $7^{th}$ transistor, a gate of the $10^{th}$ transistor and a gate of the $11^{th}$ transistor are electrically connected to the first node; a source of the $7^{th}$ transistor, a source of the $10^{th}$ transistor and a source of the $11^{th}$ transistor receive the first low reference signal; a source of the $8^{th}$ transistor receives the second low reference signal; and a drain of the $8^{th}$ transistor is electrically connected to the scan signal output end of the current stage; and wherein a gate of the $12^{th}$ transistor, a source of the $12^{th}$ transistor and a source of the $15^{th}$ transistor receive the second low-frequency clock signal; a drain of the $12^{th}$ transistor, a gate of the $15^{th}$ transistor and a drain of the $17^{th}$ transistor are connected to each other; a drain of the $15^{th}$ transistor, a gate of the $13^{th}$ transistor, a gate of the $14^{th}$ transistor and a drain of the $16^{th}$ transistor are connected to each other; a drain of the $14^{th}$ transistor, a gate of the $16^{th}$ transistor and a gate of the $17^{th}$ transistor are electrically connected to the first node; a source of the $13^{th}$ transistor, a source of the $16^{th}$ transistor and a source of the $17^{th}$ transistor receive the first low reference signal; a source of the $14^{th}$ transistor receives the second low reference signal; and a drain of the $14^{th}$ transistor is electrically connected to the scan signal output end of the current stage.

11. The GOA circuit of claim 10, wherein the first pull-down maintaining unit and the second pull-down maintaining unit alternatively works.

12. The GOA circuit of claim 8, wherein a voltage level of the first low reference signal is lower than a voltage level of the second low reference signal; a voltage level of the control signal is equal to the voltage level of the first low reference signal when the control signal corresponds to a low voltage level; and a voltage level of the starting signal is equal to the voltage level of the second low reference signal when the starting signal corresponds to a low voltage level.

13. A gate driver on array (GOA) circuit, comprising a first GOA unit and a plurality of second GOA units, the first GOA unit and the plurality of second GOA units being cascaded, wherein the first GOA circuit comprises:

a first pull-up control module, comprising:

a first transistor, having a gate receiving a control signal, a source receiving a starting signal, and a drain electrically connected to a first node, wherein when the first transistor is turned off, a voltage level of the gate of the first transistor is lower than a voltage level of the source; the source of the first transistor is an end for signal inputting; and the drain of the first transistor is an end for signal outputting;

a first pull-up module, electrically connected to the first node, a stage signal output end of a current stage and a scan signal output end of the current stage, configured to receive a high-frequency clock signal and output a stage signal of the current stage and a scan signal of the current stage under a control of a voltage level of the first node;

a first pull-down module, electrically connected to the first node, configured to receive a $(N+M)^{th}$-stage scan signal and a first low reference signal and to pull down the voltage level of the first node under a control of the $(N+M)^{th}$-stage scan signal and the first low reference signal; and a first pull-down maintaining module, electrically connected to the first node and the scan signal output end of the current stage, configured to receive a first low-frequency clock signal, a second low-frequency clock signal, the first low reference signal and a second low reference signal and to maintain the voltage level of the first node and a voltage level of the scan signal of the current stage as a voltage level of the first low reference signal after the pull-down module pulls down the voltage level of the first node;

wherein each of the plurality of second GOA units comprises:

a second pull-up control module, comprising:

a second transistor, having a gate receiving a $(N-M)^{th}$-stage stage signal, a source receiving a $(N-M)^{th}$-stage scan signal, and a drain electrically connected to a second node;

a second pull-up module, electrically connected to the second node, a stage signal output end of a current stage and a scan signal output end of the current stage, configured to receive a high-frequency clock signal and output a stage signal of the current stage and a scan signal of the current stage under a control of a voltage level of the second node;

a second pull-down module, electrically connected to the second node, configured to receive the $(N+M)^{th}$-stage scan signal and the first low reference signal and to pull down a voltage level of the second node under a control of the $(N+M)^{th}$-stage scan signal and the first low reference signal; and a first pull-down maintaining module, electrically connected to the second node and the scan signal output end of the current stage, configured to receive a first low-frequency clock signal, a second low-frequency clock signal, the first low reference signal and a second low reference signal and to maintain the voltage level of the second node and a voltage level of the scan signal of the current stage as a voltage level of the first low reference signal after the pull-down module pulls down the voltage level of the second node, where M and N are integers and N is greater than M.

14. The GOA circuit of claim 13, wherein the first transistor is an N-type transistor and a voltage level of the control signal is lower than a voltage level of the starting signal when the voltage level of the control signal and the voltage level of the starting signal correspond to a low voltage level.

15. The GOA circuit of claim 14, wherein the voltage level of the control signal is equal to the voltage level of the starting signal when the voltage level of the control signal and the voltage level of the starting signal correspond to a high voltage level.

16. The GOA circuit of claim 13, wherein the first transistor is a P-type transistor and a voltage level of the control signal is lower than a voltage level of the starting signal when the voltage level of the control signal and the voltage level of the starting signal correspond to a high voltage level.

17. The GOA circuit of claim 13, wherein the second GOA unit further comprises:

a reset module, electrically connected to the first node, configured to receive a reset signal and a first low reference signal and to initialize a voltage level of the first node under a control of the reset signal;

wherein the control signal and the reset signal are a same signal.

18. The GOA circuit of claim 17, wherein the reset module comprises:

a reset transistor, having a gate receiving the reset signal, a source receiving the first low reference signal, and a drain electrically connected to the second node.

* * * * *